March 3, 1942.  G. A. BRACE  2,274,660
REFRIGERATION
Filed Dec. 31, 1938  4 Sheets-Sheet 1

INVENTOR
George A. Brace
BY
Harry S. Dumars
ATTORNEY

March 3, 1942.  G. A. BRACE  2,274,660
REFRIGERATION
Filed Dec. 31, 1938  4 Sheets-Sheet 2

INVENTOR
George A. Brace
BY
Harry S. Ducasse
ATTORNEY

March 3, 1942.                G. A. BRACE                2,274,660
                              REFRIGERATION
                         Filed Dec. 31, 1938        4 Sheets-Sheet 3

INVENTOR
George A. Brace
BY
Harry T. Dumasse
ATTORNEY

March 3, 1942.                G. A. BRACE                 2,274,660
                              REFRIGERATION
                         Filed Dec. 31, 1938          4 Sheets-Sheet 4

INVENTOR
George A. Brace
BY
Harry S. Demarsh
ATTORNEY

Patented Mar. 3, 1942

2,274,660

UNITED STATES PATENT OFFICE 2,274,660

REFRIGERATION

George A. Brace, Winnetka, Ill., assignor to The Hoover Company, North Canton, Ohio, a corporation of Ohio Application December 31, 1938, Serial No. 248,671

30 Claims. (Cl. 62—5)

This application relates to the art of refrigeration and more particularly to a novel absorption refrigerating system.

The present invention represents certain improvements over the invention disclosed in my co-pending application Serial No. 220,196, filed July 20th, 1938. The said co-pending application discloses an absorption refrigerating system of the type utilizing an inert pressure equalizing medium in which all fluids are positively circulated through their respective circuits by a small mechanical circulator for the pressure equalizing medium. The liquid refrigerant supplied to the evaporator is propelled upwardly therethrough as it is evaporating into the pressure equalizing medium by the sweeping or dragging action exerted on the liquid refrigerant by a relatively high velocity stream of the pressure equalizing medium. The absorption solution is elevated from the level of the boiler to a higher elevation in an absorber vessel through which it is propelled by the sweeping or dragging action exerted thereon by a relatively high velocity stream of pressure equalizing medium. The absorption solution then flows by gravity in its path of flow back to the boiler through another absorber element.

My prior invention proposed to regulate the rate of flow of the absorption solution by providing relatively large receptacles in the absorption solution line which tend to iron out or to eliminate certain inevitable fluctuations in the liquid levels within the system. This construction, though satisfactory, will not meet conditions induced by violent system fluctuation, it is not an exact metering arrangement and, further, it requires that the same quantity of absorption solution be circulated through each of the absorber vessels.

Accordingly, it is a specific object of the present invention to provide an absorption refrigerating system of the type above referred to in which the rate of flow of the absorption solution through either one or both the absorber vessels is exactly regulated by a simple reliable and accurate metering device.

It is a further object of the invention to provide a metering device of the character above referred to which operates directly in response to the rate of circulation of the pressure equalizing medium.

It is a further object of the invention to provide an absorption refrigerating system which is provided with a plurality of absorber vessels through one of which a large quantity of absorption solution circulates which is then divided into a metered stream and a non-metered stream. The metered stream is then conducted to another absorber vessel from which it returns to the boiler and the unmetered stream is returned to the inlet of the initial absorber for recirculation therethrough.

Heretofore, absorption refrigerating systems of the type above referred to have been arranged in a cabinet construction with the mechanism distributed in a lower mechanism compartment and a vertically extending cooling air flue. This arrangement was very wasteful of space and practically prevented the provision of a storage chamber in the cabinet beneath the refrigerated food storage compartment. Additionally, with prior arrangements, it was necessary to construct the lower mechanism compartment at a relatively great height which resulted in an expensive cabinet construction and an appreciable wastage in space.

Accordingly, it is an object of the present invention to provide an absorption refrigerating system in which the mechanism is distributed in a compact efficient manner in a rear air cooling flue and in the extreme rear portion of the lower compartment whereby a storage compartment of substantial size may be formed in the cabinet beneath the refrigerated food storage compartment.

Other objects and advantages of the invention will become apparent as the description proceeds when taken in connection with the accompanying drawings, in which.

Figure 6:
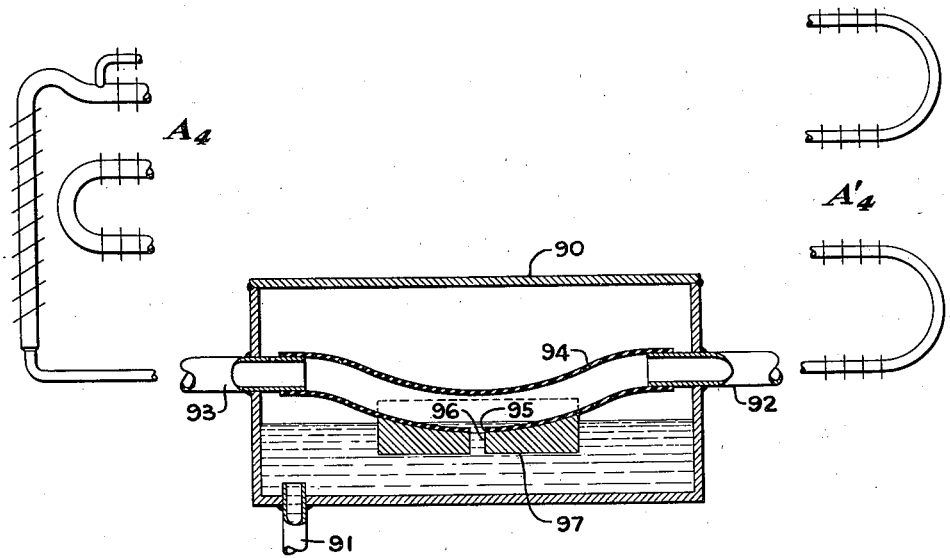

Figure 6 diagrammatically illustrates another modification of the invention.

Figure 1:
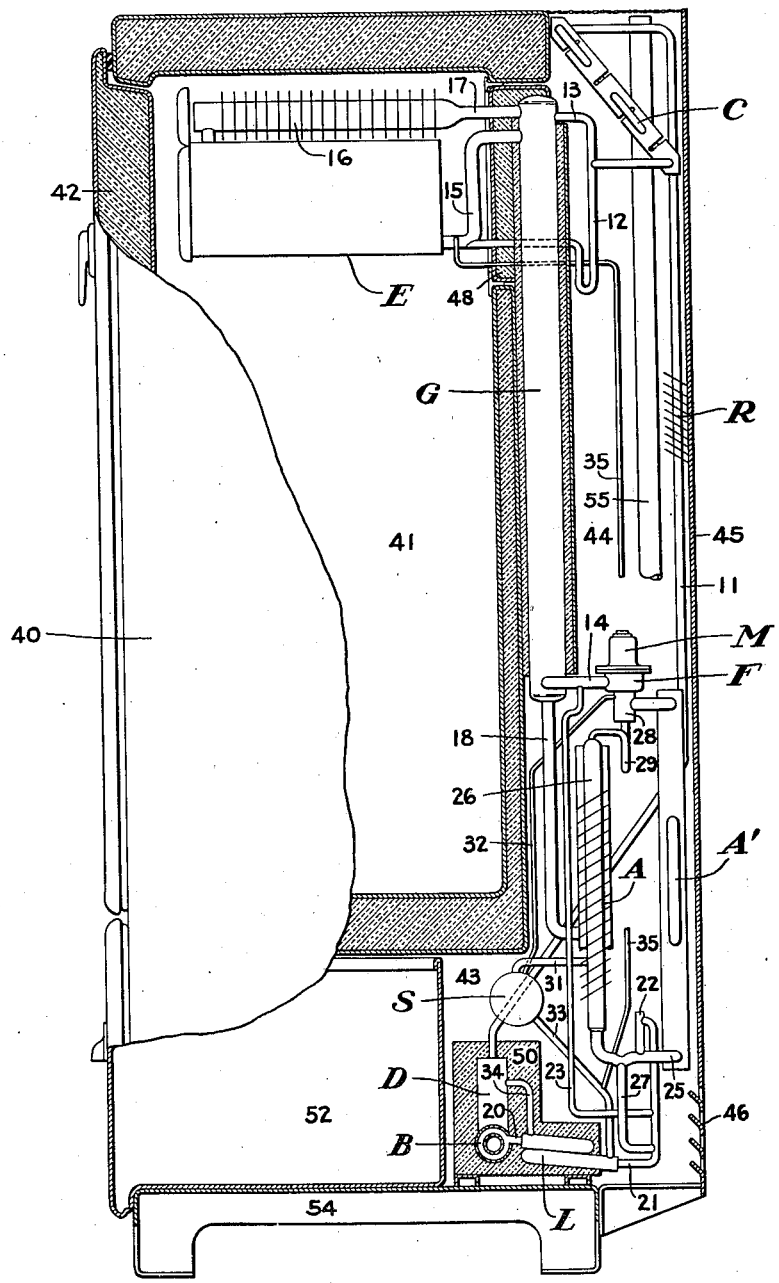
Figure 1 is a partial sectional view in side elevation of a refrigerator cabinet embodying the present invention.
Figure 2:
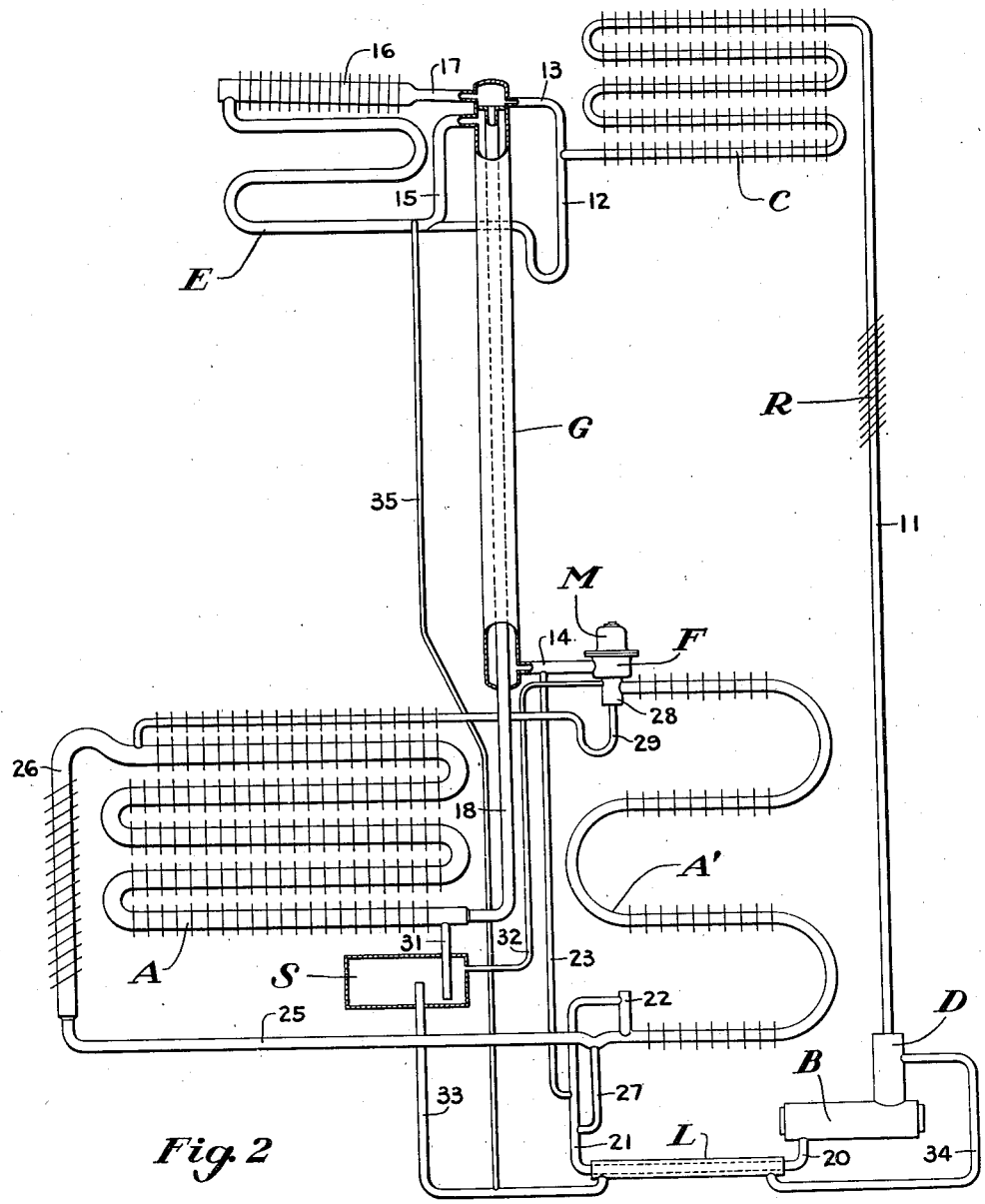
Figure 2 is a diagrammatic representation of the refrigerating system illustrated in the cabinet of Figure 1.

Referring now to the drawings in detail and first to Figures 1 and 2 thereof, there is disclosed an absorption refrigerating system of the three-fluid type comprising a boiler B, an analyzer D, an air-cooled rectifier R, a tubular air-cooled inclined condenser C, an evaporator E, a gas heat exchanger G, a liquid heat exchanger L, a pair of tubular air-cooled absorber vessels A and A', a solution reservoir S, and a circulating fan F which is driven by a suitable electrical motor M which is hermetically sealed into the system. The above described elements are suitably connected by a plurality of conduits forming a plurality of gas and liquid circuits constituting a complete refrigerating system to which reference will be made in more detail hereinafter.

The above described system is charged with a suitable refrigerant, such as ammonia, a suitable absorbent, such as water, and a pressure equalizing medium preferably a dense inert gas, such as nitrogen.

The boiler B is heated in any suitable manner as by an electrical cartridge heater or a combustible fuel burner. The boiler B and the circulating motor M may be under the control of any desired regulating mechanism. A preferred control mechanism is disclosed and claimed in the co-pending application of Curtis C. Coons, Serial No. 148,424, filed June 16th, 1937, now Patent No. 2,228,343, issued January 14, 1941.

Referring now to Figure 2, the refrigerating system per se will be described. The application of heat to the boiler B generates refrigerant vapor from the strong solution therein contained. The vapors so generated pass upwardly through the analyzer D in counterflow relationship to strong solution flowing downwardly therethrough, whereby further refrigerant vapor is generated from the strong solution by the heat of condensation of absorption solution vapor liberated in the boiler. The resulting refrigerant vapor is conveyed from the analyzer D to the top portion of the condenser C by a conduit 11 which includes the air-cooled rectifier R wherein absorption solution vapor which passes through the analyzer is condensed. The refrigerant vapor is condensed in the condenser C by heat exchange with ambient air and is discharged through a conduit 12 including a U-shaped liquid seal portion into the bottom portion of the evaporator E. The condenser is vented by a conduit 13 to the rich gas side of the gas heat exchanger.

The evaporator E may be of any suitable or desired construction, a preferred construction being illustrated in the co-pending application of Curtis C. Coons and William H. Kitto, Serial No. 386,395, filed April 2nd, 1941, a continuation-in-part of their application Serial No. 220,189, filed July 20th, 1938. The bottom portion of the evaporator is supplied with lean pressure equalizing medium which discharges from the circulating fan F through the conduit 14, the outer path of the gas heat exchanger G, and the conduit 15 which opens into the bottom portion of the evaporator E. The evaporator E is constructed of relatively small diameter tubing, as will be explained in more detail hereinafter, wherefore the inert gas flows therethrough at a relatively high velocity which is sufficient to sweep or drag the liquid refrigerant through all portions thereof as it is evaporating into the inert gas stream to produce refrigeration. The rich mixture of pressure equalizing medium and refrigerant vapor formed in the evaporator E and in the box-cooling conduit 16 thereof is conveyed from the box-cooling conduit 16 through a conduit 17 to the inner path of the gas heat exchanger G from which it is conveyed by a conduit 18 to the lower portion of the absorber A.

The weak solution formed in the boiler B by the generation of refrigerant vapor therefrom is conveyed from the boiler by a conduit 20, the inner path of the liquid heat exchanger L, and a conduit 21 which opens into an upstanding chamber 22 which communicates with the bottom portion of the absorber A'. The bottom portion of the absorber A' is at an elevation slightly above the liquid level prevailing in the boiler-analyzer system B—D. In order to elevate the lean solution into the absorber A' a small gas bleed-off conduit 23 is connected between the circulating fan discharge conduit 14 and the elevating conduit 21 below the liquid level prevailing therein whereby the weak solution is elevated into the absorber by gas lift action.

The bottom portion of the absorber A' is connected to a conduit 25 which opens into a finned air-cooled discharge conduit 26 of the absorber A. A small loop is formed in the conduit 25 just ahead of its point of connection with the vessel 22 and is drained by a conduit 27 into the lean solution elevating conduit 21. This conduit takes care of any solution finding its way into the conduit 25 from the absorber A and also drains any solution which may flow counter to the inert gas stream in the absorber A'. The absorber A', like the evaporator E, is constructed of relatively small diameter tubing and is connected in circuit as will be apparent hereinafter in such fashion that the inert gas flows upwardly therethrough at a relatively high velocity. The inert gas propels the absorption solution discharged in the vessel 22 upwardly through the absorber A' as it is absorbing refrigerant vapor.

The absorption solution and inert gas which have traveled upwardly through the absorber A' discharge into a separating chamber 28 which is connected to the suction inlet of the circulating fan F. The inert gas content of the mixture flows into the circulating fan where it is first placed under pressure and then discharged into the conduit 14 as described heretofore. The absorption solution, however, settles to the bottom of the chamber 28 from which it is conveyed through a conduit 29 which includes a U-shaped liquid seal portion to the upper gas outlet portion of the absorber A. The absorption solution flows downwardly through the absorber A in counterflow to the rich mixture pressure equalizing medium flowing upwardly therethrough from the rich gas conduit 18. The heat of absorption is rejected to air flowing over the outer walls of the absorber vessel and the strong solution formed therein is discharged through a conduit 31 into the solution reservoir S.

The solution reservoir S is vented by means of a small conduit 32 to the suction inlet of the circulating fan F. The strong solution in the reservoir is returned to the analyzer D by way of the conduit 33, the outer path of the liquid heat exchanger L, and the conduit 34. The drain conduit 35 for the evaporator also connects to the conduit 33. The conduit 31 extends down into the vessel S below the level of the top of the drain conduit 33. This provides a pressure balancing liquid column in the reservoir to prevent inert gas from by-passing from the absorber A through 31, S, and 32 into the fan as the gas pressure in absorber A is higher than the fan suction pressure to which the reservoir is subjected by the vent 32.

The arrangement of the apparatus within the cabinet will now be described. The cabinet, which is generally designated as 40, comprises an insulated refrigerating compartment 41 which is closed by an insulated door 42. The cabinet construction is provided with a mechanism and storage compartment 43 beneath the insulated compartment 41 and a rear vertically extending cooling flue 44. In order to promote clarity of illustration, the flue 44 has been shown exaggerated in depth in the accompanying drawings. The rear panel 45 of the flue 44 may be provided with air inlet louvers at any desired point; as shown, there are a plurality of louvers 46 at the bottom portion thereof and the bottom of the flue is directly open to cooling air.

The gas heat exchanger G is partially embedded in the rear wall of the compartment 41 and in a removable insulated window element 48 through which the evaporator gas inlet and outlet conduits 15 and 17, respectively, pass. The arrangement is such that the evaporator, window 48 and gas heat exchanger may be inserted from the rear of the box and the window element will seal the rear wall of the chamber 41.

The condenser C extends across the upper portion of the flue 44 in an inclined position in order that air which passes over one portion thereof will not later contact another portion thereof. The absorber elements A and A' are positioned in the lower portion of the flue 44 in order that they may be swept by streams of cooling air flowing upwardly through the flue. The boiler B, analyzer D, and liquid heat exchanger L are encased in a suitable block of insulation 50 which is positioned in the rear portion of the compartment 43 beneath the rear insulated wall of the storage chamber 41. The various conduits which interconnect the numerous elements constituting the complete refrigerating system are suitably arranged within the compartments 43 and 44 as illustrated.

A suitable vegetable bin or storage tray 52 is slidably mounted in the front portion of the compartment 43 and rests upon the foot portion of the refrigerator frame 54.

If desired, still greater compactness in the assembly may be provided by moving the solution reservoir S and the boiler-analyzer liquid heat exchanger assembly to the right, as viewed in Figure 1, so that the bottom portion of the chamber 41 may extend substantially to the level of the top portion of the insulating block 50. If this arrangement is desired, the absorbers A and A' may be elevated within the flue 44 in order to accommodate the solution reservoir S which will then be positioned substantially directly beneath the absorber A. This construction would economize on cabinet space but it will cut down the available capacity of the storage bin 52 by the amount which the depth of the chamber 43 is diminished.

The boiler B is provided with a waste products of combustion flue 55, only part of which is shown, which extends upwardly in one corner of the flue 44.

The operation of the invention has been partially described above and will not be duplicated herein. Some difficulty has been experienced with previous systems of the general type herein disclosed because fluctuations in the liquid level in the absorption solution circuit materially alter the rate of flow of the absorption solution and, consequently, upset operating conditions in the entire system. The present invention overcomes that objection by reason of the fact that the capacity of the gas lift pump 21 is a direct function of the pressure prevailing in the conduit 14 which is practically constant because of the constant speed of the circulating fan F. Therefore, the quantity of absorption solution which is discharged into the absorber A' by the gas lift pump 21 is substantially constant regardless of minor fluctuations and varying conditions within other portions of the solution circuit. If for any reason the quantity of inert gas circulating through the system should tend to increase its rate of flow, a corresponding increase would immediately occur in the absorption solution circuit through the action of the gas lift pump whereby the proper proportions of gas and liquid are always maintained in the absorption solution circuit.

Another advantage of the instant construction arises from the fact that the level of the absorber is largely independent of the level of the boiler because of the fact that the absorption solution is elevated into the bottom portion of the absorber by a pumping mechanism independent of the boiler and which need not, as in previous systems, elevate the solution to the top portion of the absorber. The circulation through the absorber A' is entirely in an upward direction and is independent of the pumping means utilized to elevate the solution into the absorber. By reason of this construction it is possible to place both absorbers in the cooling air flue and at an elevation substantially above the elevation of the boiler if that be desired.

The absorption solution is swept through the absorber A' in intimate contact with the liquid and at a very rapid rate which promotes excellent heat rejection to the cooling air. It should be noted that the absorber A' receives lean solution from the boiler and relatively lean inert gas from the counterflow absorber A whereby it acts as a stripping absorber which function it is well suited to perform because of the relatively very great ratio of heat transfer area to heat to be rejected. This results in returning relatively cool inert gas to the gas heat exchanger and also in lowering the refrigerant vapor content thereof to a relatively great extent because of the low temperature at which the absorber A' may operate.

The absorber A is constructed of relatively large diameter tubing whereby the inert gas flows therethrough with a velocity insufficient to exert any propelling action on the liquid. Consequently, the liquid flows downwardly through the absorber A by gravity counter to the inert gas flowing upwardly therethrough.

The absorber A carries the burden of the absorption and the absorber A' acts principally as an elevating device and as a stripping absorber. Acting jointly, however, the two absorbers produce highly efficient absorption and supply relatively very lean inert gas to the evaporator which improves the efficiency of the evaporating process.

Figure 3:
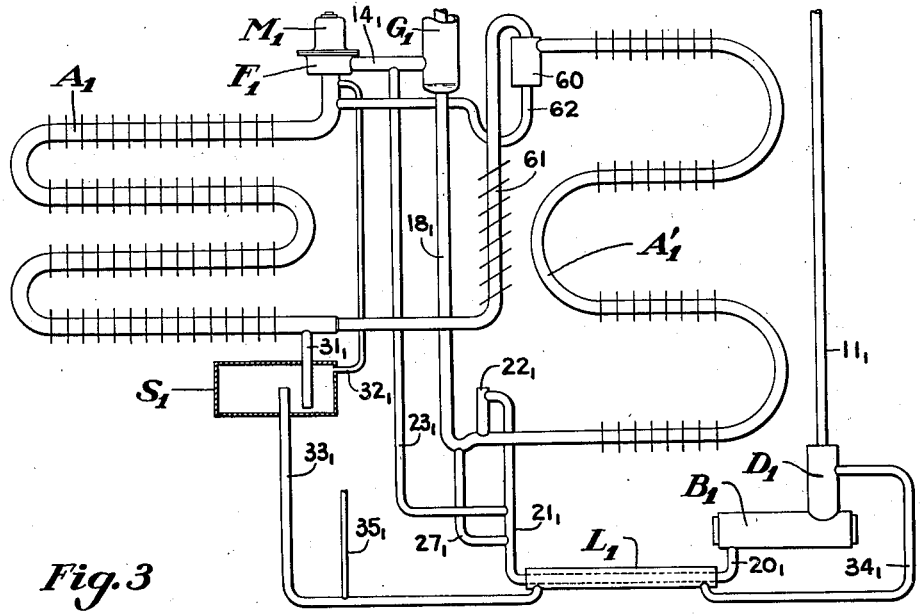
Figure 3 is a diagrammatic representation of a portion of a refrigerating system illustrating a modification in the mechanism illustrated in Figure 2.

Referring now to Figure 3, there is disclosed a modified form of the invention. Certain portions of this form of the invention are substantially identical with previously described elements and are given the same reference characters with the subscript 1.

In the form of the invention disclosed in Figures 1 and 2, the absorber A' is supplied with relatively lean inert gas from the primary absorber A. In the form of the invention disclosed in Figure 3, the absorber A'$_1$ is supplied with rich inert gas directly from the rich gas conduit 18$_1$, wherefore the absorber A'$_1$ operates as a primary absorber and elevating device and discharges the resulting inert gas and solution into a separation chamber 60. The inert gas is conveyed from the chamber 60 to the bottom portion of the absorber $A_1$ by means of a finned air-cooled conduit 61 and the absorption solution is conveyed from the separation chamber 60 to the upper portion of the absorber $A_1$ by means of a conduit 62 which includes a U-shaped sealing portion. It will also be noted in this form of the invention that the circulating fan $F_1$ has a suction inlet connected directly to the upper portion of the absorber $A_1$.

The absorber $A_1$ in this form of the invention acts as a stripping absorber by reason of the fact that it receives solution which has already passed through one absorption stage and inert gas which has already passed through one absorption stage.

Aside from the above-mentioned differences the form of the invention illustrated in Figure 3 is identical with that illustrated in Figure 1 and is intended to be connected in exactly the same type of refrigerating system and to be mounted in a cabinet in the same fashion. The principal difference between these two forms of the invention resides in the fact that in Figures 1 and 2 the elevating absorber operates with relatively lean gas and functions as a stripping absorber whereas in the form of the invention illustrated in Figure 3 the elevating absorber operates with rich gas and carries a very appreciable portion of the absorbing load. With the construction of Figure 3 the absorber $A'_1$ operates at a relatively lower temperature in order to perform its stripping function.

Figure 4:
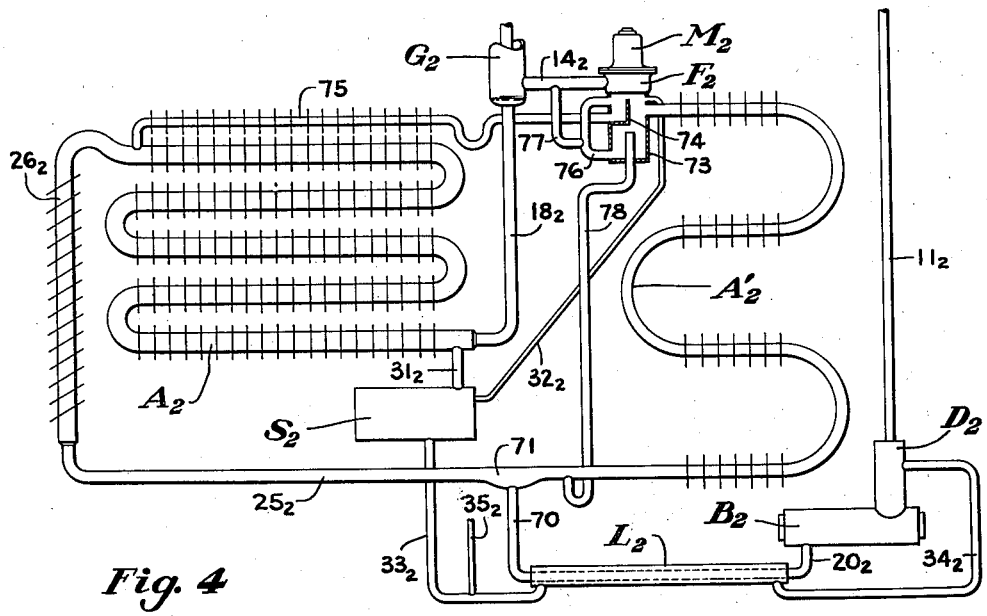
Figure 4 illustrates diagrammatically another modification of the invention.

Another form of the invention is illustrated diagrammatically in Figure 4. Certain portions of this form of the invention are identical with portions of the form of the invention illustrated in Figures 1 and 2 and are given the same reference characters with the subscript 2 attached. In this form of the invention the elevating conduit 21 is replaced by a conduit 70 which conveys the lean solution from the inner path of the liquid heat exchanger $L_2$ into an enlarged portion 71 of the conduit $25_2$ which interconnects the absorber vessels $A_2$ and $A'_2$.

In this form of the invention the lean solution which is supplied to the bottom portion of the absorber $A'_2$ is swept upwardly therethrough by the moderately lean inert gas stream discharged from the absorber $A_2$ through the conduit $25_2$. The mixture of absorption solution and inert gas which flows through the absorber $A'_2$ discharges into a separation chamber 73 which opens into the suction inlet of the circulating fan F as illustrated. A small L-shaped partition 74 is positioned intermediate the top and bottom portion of the chamber 73 and is positioned to prevent direct discharge of liquid from the absorber $A'_2$ thereinto. The chamber formed by the partition 74 communicates with the gas discharge portion of the absorber $A_2$ by means of a conduit 75 which includes a U-shaped liquid seal portion. A gas lift pump conduit 76 connects the bottom portion of the reservoir 73 into the chamber therein which is defined by the partition 74. A small bleed conduit 77 is connected between the gas discharge conduit $14_2$ and the conduit 76 in order to elevate solution from the bottom portion of the chamber 73 into the chamber formed by the partition 74 by gas lift action. A conduit 78 extends upwardly from the bottom portion of the chamber 73 to a level slightly below the level of the bottom portion of the chamber 74 and communicates with the bottom portion of the absorber $A'_2$ as illustrated.

In this form of the invention no effort is made to meter the solution supplied to the elevating and stripping absorber $A'_2$, but the gas lift pump 76, 77 serves to withdraw a fixed accurately determined portion of the liquid circulating through the absorber $A'_2$ and to discharge the same into the primary absorber $A_2$. Any liquid over and above the amount thus conveyed from the separation chamber 73 to the conduit 75 is returned to the inlet portion of the stripping absorber $A'_2$ by means of the conduit 78. In this form of the invention, therefore, there is a quantity of liquid which continuously recirculates through the absorber $A'_2$.

An undesirably large quantity of the absorption solution may be supplied by gravity by way of the conduit 70. However, under normal conditions there will be no appreciable discharge through the conduit 78 as the quantity of liquid supplied to the inlet portion of the absorber $A'_2$ will be equal to the capacity of the gas lift pump 76.

Other than in the respect immediately above cited, the form of the invention illustrated in Figure 4 operates in exactly the same manner as that illustrated and described in connection with Figures 1 and 2.

Though the form of the invention disclosed in Figure 4 has been illustrated in a system in which lean gas is supplied to the elevating absorber $A'_2$, it is not limited to that arrangement but it may be incorporated in a system in which rich gas is supplied to the elevating absorber $A'_2$ similarly to the form of the invention disclosed in Figure 3.

Figure 5:
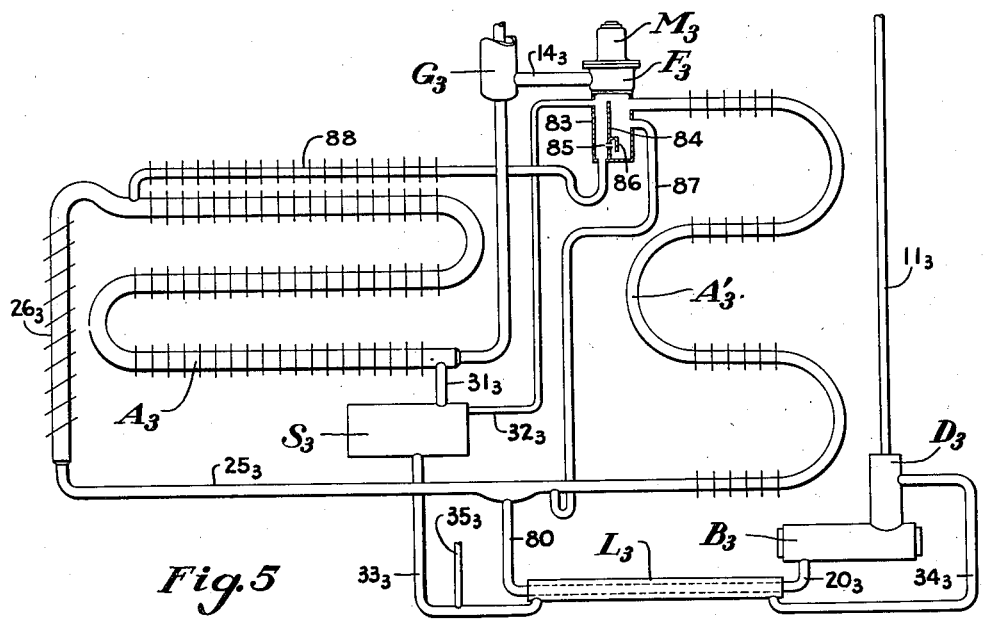
Figure 5 illustrates diagrammatically another modification of the invention.

In Figure 5 there is illustrated still another modified form of the invention, portions of which are identical with elements described in connection with Figure 1 and are given the identifying subscript 3. In this form of the invention the lean solution developed in the boiler is supplied to the conduit $25_3$ which connects the bottom portion of the absorbers $A_3$ and $A'_3$ by means of a conduit 80 which connects an enlarged portion of the conduit $25_3$ to the inner pass of the liquid heat exchanger $L_3$. Solution is conveyed by gravity from the boiler to the inner pass of the liquid heat exchanger $L_3$ by conduit $20_3$. The absorption solution and inert gas travels upwardly through the absorber $A'_3$ which is a stripping absorber as in Figures 1, 2 and 4 and then discharges into a separation vessel 83 which opens into the suction inlet of the circulating fan $F_3$. The vessel 83 is interiorly divided into two chambers by an upstanding partition 84 which is provided with a small metering orifice 85 in the lower portion thereof. A shielding element 86 is positioned adjacent the orifice 85 on the side thereof adjacent the discharge point of the absorber $A'_3$ to prevent scale and the like from entering the orifice. A liquid level regulating conduit 87 is connected between the vessel 83 at a level appreciably above the level of the orifice 85 and the inlet portion of the absorber $A'_3$. The side of the chamber 83 which is separated from the discharge of the absorber $A'_3$ by the partition 84 is drained to the gas outlet portion of the primary absorber $A_3$ by means of the conduit 88 which includes a U-shaped liquid seal portion.

This form of the invention is designed in such fashion that there will be a continual small overflow to the conduit 87 thereby maintaining a substantially constant liquid head on the orifice 85 as a result of which there will be a sustained and constant flow of absorption solution into the primary absorber A₃. Therefore, fluctuations in the liquid levels of the system will slightly increase or decrease the quantity of absorption liquid which is recirculated through the absorber A'₃, but without affecting the quantity of absorption solution which circulates as a whole and, particularly, through the primary absorber A₃.

Except in the respects above noted this form of the invention operates in identically the same manner as the form of the invention described in connection with Figures 1 and 2.

Though the form of the invention disclosed in Figure 5 has been illustrated in a system in which lean gas is supplied to the elevating absorber A'₃, it is not limited to that arrangement but it may be incorporated in a system in which rich gas is supplied to the elevating absorber A'₃ similarly to the form of the invention disclosed in Figure 3.

In Figure 6 there is illustrated a still further modification of the invention. This form of the invention does not provide recirculation of absorption solution through one of the absorber vessels. However, it is applicable either to a form of the invention such as that disclosed in Figures 1, 2, 4 and 5 in which the elevating absorber operates with lean gas or to a form of the invention such as that disclosed in Figure 3 in which the elevating absorber operates with rich gas.

The absorber vessels A'₄ and A₄, which are shown fragmentarily, are identical with the absorber vessel A' and A described in connection with Figure 1. Absorption solution is supplied by gravity from the boiler to a regulating chamber 90 by means of a conduit 91 which corresponds to the conduits 21, 21₁, 70 and 80. The elevating absorber vessel A'₄ is connected to this chamber by a conduit 92 and inert gas whether it be rich or lean gas is led thereinto on the opposite side from its point of connection to the conduit 92 by means of a conduit 93. The conduits 92 and 93 are connected by means of a flexible conduit 94 of rubber or fabric which is not attacked by ammonia and water. The central bottom portion of the conduit 94 is provided with an opening 95 which coincides with an opening 96 in a float block 97 which is suitably attached to the bottom central portion of the flexible conduit 94.

In the operation of this form of the invention the conduit 94 will be made sufficiently small in diameter so that the inert gas flowing therethrough will sweep or drag liquid refrigerant into the elevating absorber A'₄. The liquid level maintained in the bottom central portion of the conduit 94 will always be constant by reason of the fact that the float 97 will rise or fall in conformity with any changes of the liquid level within the chamber 90 wherefore there will be a constant rate of absorption solution circulation through the absorbers A'₄ and A₄ regardless of the manner in which the same may be connected in circuit and regardless of liquid level fluctuations in the boiler-analyzer absorber system.

It is characteristic of all forms of the invention described that the absorption solution and liquid refrigerant are circulated through portions of the system solely by the sweeping and dragging action of the relatively high velocity stream of inert gas flowing through the same circuit. The propelling characteristics of the inert gas are functions of a number of factors which will be delineated generally below.

The propelling power of the inert gas stream is a function of its density, pressure, and velocity of flow through the evaporator or elevating absorbers. In general, an increase in the value of any one or more of the above enumerated factors results in an increase in the lifting power of the inert gas. Other things being equal, the velocity of the inert gas will be a function of the effective cross-sectional area of its path of flow, and an increase in the effective cross-sectional area of that path results in a decrease in gas velocity.

It is for these reasons that the cross-sectional area of the elevating absorber sections is materially less than the cross-sectional area of the counterflow absorber sections. For example, it has been found that a propelled stream of nitrogen will circulate liquid upwardly through an evaporator or an absorber conduit of a size suitable for domestic use having an inside diameter of approximately one-half inch, a pressure differential of between two and four inches of water between the gas inlet and outlet connections to the evaporator or absorber, and with a total system pressure ranging between 270 and 400 pounds per square inch. Under the conditions just enumerated it has been found that liquid will flow counter to the gas stream in a conduit, such as the counterflow absorbers disclosed herein, having an inside diameter of approximately one-inch or more. These dimensions are illustrative only and are not limiting since other conditions permit conduit sizes different from those mentioned.

A continuous stream of the inert gas traverses the evaporator and absorber and conveys the liquid refrigerant and absorption solution through horizontal or slightly sloping conduits by sweeping or dragging the liquid along the bottom of the conduit, but in substantially vertical or elevating conduits, such as the return bends connecting the substantially horizontal evaporator and absorber conduits, the gas is blowing through a body of the liquid. Therefore, in the horizontal or slightly inclined conduits the gas stream sweeps over a stream of liquid which it propels and agitates by exerting a frictional drag thereon; whereas, in the substantially vertical conduits the gas is blowing through a relatively large body of the liquid in the lower portions of such conduits with which it is in intimate contact. The friction and impact of the gas blowing through the bodies of liquid in the riser or elevating conduits drags or sweeps a portion of that liquid upwardly into the next conduit section. Thus, absorption takes place in the elevating absorbers through the action of a high velocity gas stream propelling a liquid through a horizontal or inclined conduit and through the action of a gas stream forcing itself through a body of liquid in an elevating conduit while conveying part of the body of liquid to a higher elevation. The gas and liquid contact in the evaporator is also of two types; that is, the gas sweeps or drags the liquid through horizontal or slightly inclined conduits and blows or blasts through columns of liquid in the elevating conduits of the evaporator.

The gas has been described as being propelled at a high velocity, but this is to be interpreted in relation to the other conditions prevailing within the system. For example, in the particular embodiment disclosed the gas velocity need be only of the order of a few feet per second in order to circulate the fluids and to promote effective absorption and evaporation if a dense inert gas like nitrogen is utilized.

The flow of inert gas through the evaporator and absorber is substantially continuous and steady though there is a pressure gradient from the inlet to the outlet portions thereof due to the throttling action of the liquid, particularly in rising conduits, on the gas stream. This insures substantially continuous uniform propulsion of liquid through the evaporator and absorber and continuous absorption of refrigerant whenever the refrigerating mechanism is operating.

The liquid circulating system embodied in the refrigerating systems herein disclosed possesses a very important characteristic in that the volume of inert gas circulating through the evaporator or elevating absorber is relatively very great as compared with the volume of liquid refrigerant or absorption solution supplied to the evaporator or absorber per unit of time. In the case of the evaporator, it has been found advantageous to circulate several hundred times as much gas as liquid per unit of time in order to produce temperature conditions suitable for the production of ice and for the preservation of foodstuffs. In the case of the absorber, the ratio of gas volume to liquid volume is also very high though it is lower than the ratio of inert gas volume to liquid refrigerant volume per unit of time because the volume of solution circulating may be several times the volume of the circulating liquid refrigerant. The high ratio of gas to liquid volumes in the absorber is advantageous because the quantity of refrigerant vapor per unit volume of gas is not sufficient to raise the concentration of a unit volume of absorption solution appreciably, and it is highly advantageous to operate the boiler with relatively highly concentrated absorption solution.

In the foregoing detailed description of the various embodiments of the invention which have been given in order to illustrate the various ways in which the principles in the invention may be put into practice, it will be appreciated that I have provided a very simple refrigerator having many advantages over systems heretofore known. All fluids in the system may be positively circulated by a single fan of small size.

The various pumping and metering devices disclosed in different modifications of the invention serve to prevent fluctuations in the level of the solution in the boiler-analyzer system from effecting the rate at which the absorption solution circulates through its circuit and to assure proper operation of all portions thereof. Consequently, the rate of circulation of the absorption solution is substantially constant and is effected only by fan speed and the pressure within the system.

The principles of the present invention have been disclosed specifically only with respect to the absorption solution circuit; however, they are equally applicable to other fluid circuits such as the liquid refrigerant circuit in absorption refrigerating systems. Also, the invention is not limited to a system employing a counterflow absorber section though that arrangement is regarded as preferable.

Though the elevating absorbers have been illustrated as being constructed of return bent tubing, such an arrangement is not mandatory. The elevating absorbers may comprise a series of short horizontal conduit sections joined by vertical or slightly inclined conduits. If it is found to be unnecessary or undesirable to place an absorbing load on the solution elevating mechanism in any particular system, the above described conduit arrangement is satisfactory with or without cooling fins. In this case the inert gas elevates the solution as before but with less absorption. In those forms of the invention utilizing a gas lift pump for regulating the solution flow the absorber may be placed very high in the air flue and/or may be very high as the gas lift pump may also function as a solution elevating device.

The novel refrigerating systems herein disclosed and claimed also are arranged to be fitted into a domestic refrigerating cabinet, to make the most economical utilization of the available space and to provide for a vegetable storage bin. With the absorber construction herein disclosed it is no longer necessary to place part or all of the absorber in the mechanism compartment beneath the insulated storage chamber, nor is it necessary that that compartment have a height at least equal to the combined height of the boiler, analyzer and absorber system. According to the present invention the mechanism compartment beneath the insulated storage compartment may have a height equal only to the combined height of the boiler-analyzer and its insulating material. The cabinet arrangement herein disclosed provides ample space in the cabinet beneath and to the rear of the insulated storage compartment for the mechanism and a suitable vegetable storage or like receptacle. Additionally, the compact assembly which is made possible by the invention lends itself very readily to easy assembly and simplifies the problem of assembling absorption refrigerating systems in cabinets, all of which contributes to a desirable, economical, practical, useable, commercial product.

It will be understood that in the forms of the invention disclosed in Figures 4 and 5, the solution circulating through the elevating absorber sections may be divided in the separation vessel attached to the suction side of the fan. In this event a predetermined quantity of the solution supplied to the separation chamber will be conveyed into the associated counterflow absorber section and the balance of the collected solution will be conveyed through the drains (78 or 87) into the liquid inlet portion of the elevating absorber to be recirculated therethrough.

While the invention is disclosed herein in considerable detail, various changes may be made in the arrangement, construction and proportion of the parts without departing from the spirit of the invention or the scope of the appended claims.

I claim:

1. Refrigerating apparatus comprising a pressure equalizing medium circuit including an evaporator and an absorber, a solution circuit including a boiler and said absorber, a power-driven pump for circulating pressure equalizing medium through said pressure equalizing medium circuit, means for supplying refrigerant to said evaporator below the top thereof, means for supplying an absorbent to said absorber below the top thereof, said pressure equalizing medium circuit being so constructed and arranged that the pressure equalizing medium circulating therethrough functions to elevate refrigerant and absorbent through said evaporator and said absorber, respectively, and means for metering the flow of liquid in one of said circuits.

2. Absorption refrigerating apparatus comprising a pressure equalizing medium circuit including an evaporator and an absorber, a solution circuit including said absorber and a boiler, means for supplying refrigerant vapor generated by said boiler to the bottom portion of said evaporator in liquid form, means for circulating a pressure equalizing medium through said pressure equalizing medium circuit, the arrangement being such that said pressure equalizing medium functions simultaneously to elevate liquid refrigerant through said evaporator as it is vaporizing and to elevate absorption solution in said absorber as it is absorbing refrigerant vapor, and means in said solution circuit for limiting the flow of solution therethrough.

3. Absorption refrigerating apparatus including a pressure equalizing medium circuit having an evaporator and an absorber therein, means for supplying liquid refrigerant to said evaporator, power-driven means for propelling a pressure equalizing medium through said circuit, said absorber comprising a pair of absorber sections, means for supplying absorption solution to the bottom of one of said sections, means for conveying absorption solution from the top of said one absorber section to the top portion of the other absorber section, means for draining absorption solution from the bottom portion of said other absorber section, the arrangement being such that said pressure equalizing medium elevates absorption solution through said one absorber section and flows in counterflow relation to absorption solution in the other of said sections, and means for regulating the rate at which absorption solution flows through said one absorber section under the impetus of the pressure equalizing medium.

4. Refrigerating apparatus comprising a pressure equalizing medium circuit including a pair of conduits having different cross-sectional areas, an absorption solution circuit including said conduits, means for circulating a pressure equalizing medium upwardly through each of said conduits, the arrangement being such that absorption solution is elevated through the conduit of smallest cross-sectional area by the frictional drag exerted thereon by the gas stream flowing therethrough, means in said solution circuit for draining the absorption solution elevated through the conduit of small cross-sectional area by the drag of the pressure equalizing medium flowing therethrough into the upper portion of the conduit of large cross-sectional area, and means in said absorption solution circuit for regulating the rate at which absorption solution flows therethrough under the impetus of the pressure equalizing medium.

5. Absorption refrigerating apparatus including in circuit an evaporator, an absorber assembly, a boiler, means for supplying refrigerant vapor generated in said boiler to the bottom portion of said evaporator in liquid phase, means for conveying weak solution from said boiler to the bottom portion of said absorber assembly, means for conveying strong solution from said absorber assembly to said boiler, power driven means for circulating said liquid refrigerant and absorption solution upwardly through said evaporator and said absorber assembly respectively by propelling a high velocity dense inert gas stream therethrough to drag along said liquid refrigerant and absorption solution at a lower velocity than said gas stream, and means for regulating the quantity of solution flowing through said absorber assembly independently of the propelling force exerted thereon by the inert gas.

6. Absorption refrigerating apparatus comprising a pressure equalizing medium circuit including an evaporator and an absorber, a solution circuit including a boiler and said absorber, means for propelling the pressure equalizing medium through said pressure equalizing medium circuit, means for supplying refrigerant vapor generated in said boiler to said evaporator in liquid phase, means included in said solution circuit for elevating solution from said boiler into said absorber comprising a conduit connected in said pressure equalizing medium circuit through which the pressure equalizing medium sweeps or drags absorption solution, and means in said solution circuit for controlling the quantity of solution supplied to said absorber by said elevating means.

7. Absorption refrigerating apparatus comprising a pressure equalizing medium circuit including an evaporator and an absorber, a solution circuit including a boiler and said absorber, means for propelling the pressure equalizing medium through said pressure equalizing medium circuit, means for supplying refrigerant vapor generated in said boiler to said evaporator in liquid phase, means in said solution circuit for elevating solution into said absorber comprising a conduit connected in said pressure equalizing medium circuit through which the pressure equalizing medium sweeps or drags absorption solution, a gas lift pump connected in said solution circuit to govern the supply of solution to said absorber, and means in said pressure equalizing medium circuit for supplying pressure equalizing medium to said gas lift pump.

8. Absorption refrigerating apparatus comprising a pressure equalizing medium circuit including an evaporator and an absorber, a solution circuit including a boiler and said absorber, means for propelling the pressure equalizing medium through said pressure equalizing medium circuit, means for supplying refrigerant vapor generator in said boiler to said evaporator in liquid phase, means in said solution circuit for elevating solution from said boiler into said absorber comprising a conduit connected in said pressure equalizing medium circuit through which the pressure equalizing medium sweeps or drags absorption solution, and a metering orifice in said solution circuit arranged to regulate the rate at which solution is supplied to said absorber.

9. Refrigerating apparatus comprising a pressure equalizing medium circuit including an evaporator and an absorber, a solution circuit including a boiler and said absorber, means for supplying refrigerant vapor generated in said boiler to said evaporator in liquid phase, means for propelling pressure equalizing medium through said pressure equalizing medium circuit under conditions such that it circulates the refrigerant and solution through said evaporator and absorber, respectively, and means in one of said circuits for regulating the quantity of liquid flowing through the absorption solution circuit uniformly and independently of fluctuations in the propelling power of the pressure equalizing medium.

10. Absorption refrigerating apparatus comprising a pressure equalizing medium circuit including an evaporator and a pair of absorbers, a solution circuit including a boiler and said absorbers, said solution circuit being arranged to supply absorption solution to the bottom of one of said absorbers from said boiler and to return solution to said boiler from the bottom portion of the other of said absorbers, a power driven circulator arranged to propel pressure equalizing medium through said one absorber under conditions such that the solution is dragged therethrough by the pressure equalizing medium, and means in said solution circuit arranged to limit the quantity of solution circulating through said solution circuit.

11. Absorption refrigerating apparatus comprising a pressure equalizing medium circuit including an evaporator and a pair of absorbers, a solution circuit including a boiler and said absorbers, said solution circuit being arranged to supply absorption solution to the bottom of one of said absorbers from said boiler and to return solution to said boiler from the bottom portion of the other of said absorbers, a power driven circulator arranged to propel pressure equalizing medium through said one absorber under conditions such that the solution is dragged therethrough by the pressure equalizing medium, and a gas lift pump in said solution circuit arranged to discharge a predetermined quantity of solution to govern the rate of solution circulation.

12. Absorption refrigerating apparatus comprising a pressure equalizing medium circuit including an evaporator and a pair of absorbers, a solution circuit including a boiler and said absorbers, said solution circuit being arranged to supply absorption solution to the bottom of one of said absorbers from said boiler and to return solution to said boiler from the bottom portion of the other of said absorbers, a power driven circulator arranged to propel pressure equalizing medium through said one absorber under conditions such that the solution is dragged therethrough by the pressure equalizing medium, a metering device in said solution circuit between said absorbers for allowing only a predetermined quantity of solution to flow from said one absorber to said other absorber and means for directing solution over and above said predetermined quantity to the inlet portion of the absorber from which it was supplied to said metering device.

13. That method of producing refrigeration by means of a refrigerant, an absorbent medium and a pressure equalizing medium which includes circulating the absorbent medium between a heated refrigerant distilling zone and an air cooled refrigerant absorbing zone, said method being characterized by the fact that absorbent medium flowing from the distilling zone is raised to an elevated point in contact with pressure equalizing medium and is then divided into two streams one of which is brought into contact with refrigerant vapor and returned to the distilling zone while the other stream is recirculated to contact with additional absorbent material from the distilling zone which is being raised to the elevated point in contact with pressure equalizing medium.

14. That method of producing refrigeration by means of a refrigerant, an absorbent medium therefor, and an inert gas which includes elevating weak absorbent solution by means of a propelled stream of inert gas, dividing the solution into a plurality of streams in a dividing zone, one of which is of a predetermined size, passing said regulated stream of a predetermined size through a refrigerant absorbing zone in counterflow to a stream of refrigerant vapor, returning the same to a refrigerant distilling zone, and recirculating another stream of solution in contact with refrigerant vapor and back to the solution dividing zone.

15. In a refrigerating apparatus an elongated passageway forming an evaporator, an elongated passageway forming an absorber, means for supplying refrigerant liquid and absorption liquid to said evaporator and absorber passageways, respectively, means for propelling an inert pressure equalizing medium through said passageways with a velocity and pressure sufficient to circulate the liquid therethrough by the frictional dragging action of the gas on the liquid, and means for governing the rate at which liquid is supplied to one of said passageways.

16. Absorption refrigerating apparatus including an evaporator and a plurality of absorber sections, power-driven means for circulating a pressure equalizing medium between said evaporator and said absorber sections with sufficient pressure to circulate absorption solution through at least one of said absorber sections, means for supplying weak absorption solution to the bottom portion of said one absorber section, means for conducting the rich pressure equalizing medium discharged from said evaporator into the bottom portion of a second absorber section, means for conveying pressure equalizing medium from the top portion of said second absorber section to the bottom portion of said one absorber section, means for conveying absorption solution from the top portion of said one absorber section to the top portion of said second absorber section, and means for regulating the rate at which absorption solution flows through said one absorber section under the impetus of the pressure equalizing medium.

17. Absorption refrigerating apparatus comprising an evaporator and an absorber means, means for circulating a pressure equalizing medium between said evaporator and said absorber means, said absorber means including a first part of the type in which the solution is circulated by the pressure equalizing medium, means for conveying weak solution to the bottom portion of said first absorber part, means for conveying rich pressure equalizing medium from said evaporator to the bottom portion of said first absorber part, means for conveying solution from the top portion of said first absorber part to the top portion of a second part of said absorber means, means for conveying pressure equalizing medium from the top portion of said first absorber part to the bottom portion of said second part of said absorber means, and means for regulating the rate at which absorption solution flows through said first absorber part under the impetus of the pressure equalizing medium.

18. In a refrigerating apparatus an evaporator, an absorber, a boiler, means for liquefying refrigerant vapor produced in said boiler and for supplying the liquid refrigerant to said evaporator, means for conducting absorption liquid from said boiler to said absorber, means for circulating inert gas between said evaporator and said absorber and for propelling the inert gas through said absorber with sufficient velocity and pressure to convey the absorption solution through said absorber by the force imparted to the liquid by the inert gas, and means in said conducting means for controlling the quantity of absorption liquid supplied to said absorber for circulation therethrough by the inert gas.

19. In a refrigerating apparatus an evaporator, an absorber, a boiler, means for liquefying refrigerant vapor produced in said boiler and for supplying the liquid refrigerant to said evaporator, means for conducting absorption liquid from said boiler to said absorber, means for circulating inert gas between said evaporator and said absorber and for propelling the inert gas through said absorber with sufficient velocity and pressure to convey the absorption solution through said absorber by the force imparted to the liquid by the inert gas, and a gas lift pump in said conducting means for supplying absorption liquid to said absorber and for regulating the quantity of absorption liquid supplied to said absorber per unit of time.

20. In a refrigerating apparatus an evaporator, an absorber, a boiler, means for liquefying refrigerant vapor produced in said boiler and for supplying the liquid refrigerant to said evaporator, means for conducting absorption liquid from said boiler to said absorber, and means for circulating inert gas between said evaporator and said absorber and for propelling the inert gas through said absorber with sufficient velocity and pressure to convey the absorption solution through said absorber by the force imparted to the liquid by the inert gas, said conducting means including a vessel arranged to receive absorption solution by gravity from said boiler, a flexible member within said vessel included in said means for circulating inert gas and provided with an opening to allow absorption solution to flow thereinto, and means constructed and arranged to maintain said opening in fixed relationship to the free surface of the absorption solution in said vessel whereby to provide a substantially constant rate of flow of absorption solution into said absorber independently of fluctuations in the levels of absorption solution in said boiler and said vessel.

21. In a refrigerating apparatus an evaporator, an absorber, a boiler, means for liquefying refrigerant vapor produced in said boiler and for supplying refrigerant liquid to said evaporator, means forming a circuit for inert gas including said evaporator, said absorber and means for circulating inert gas through said absorber with sufficient velocity and pressure to circulate absorption solution therethrough under the impulse imparted to the absorption liquid by the inert gas, means connecting said absorber and said boiler to form a circuit for circulation of absorption solution therebetween, means in said absorption solution circuit for limiting the quantity of absorption solution flowing through said boiler per unit of time to a predetermined maximum amount, and means for conducting absorption solution over and above said maximum amount through a localized portion of said absorption solution circuit.

22. In a refrigerating apparatus an evaporator, an absorber, a boiler, means for liquefying refrigerant vapor produced in said boiler and for supplying refrigerant liquid to said evaporator, means forming a circuit for inert gas including said evaporator, said absorber and means for circulating inert gas through said absorber with sufficient velocity and pressure to circulate absorption solution therethrough under the impulse imparted to the absorption liquid by the inert gas, means connecting said absorber and said boiler to form a circuit for circulation of absorption solution therebetween, said absorption solution circuit including a vessel into which absorption solution discharges after flowing through said absorber, means for discharging a substantially constant quantity of absorption solution per unit of time from said vessel for return to said boiler, and means for conducting absorption solution over and above said quantity to said absorber for recirculation therethrough.

23. In a refrigerating apparatus an evaporator, an absorber, a boiler, means for liquefying refrigerant vapor produced in said boiler and for supplying refrigerant liquid to said evaporator, means forming a circuit for inert gas including said evaporator, said absorber and means for circulating inert gas through said absorber with sufficient velocity and pressure to circulate absorption solution therethrough under the impulse imparted to the absorption liquid by the inert gas, means connecting said absorber and said boiler to form a circuit for circulation of absorption solution therebetween, said solution circuit including a gas lift pump arranged to receive absorption solution from said absorber and to discharge a substantially constant quantity of absorption solution per unit of time to limit the quantity of absorption solution flowing through said boiler per unit of time to a predetermined maximum amount, and means for conducting absorption solution over and above said maximum amount to said absorber for recirculation therethrough by the inert gas.

24. In a refrigerating apparatus an evaporator, an absorber, a boiler, means for liquefying refrigerant vapor produced in said boiler and for supplying refrigerant liquid to said evaporator, means forming a circuit for inert gas including said evaporator, said absorber, and means for circulating inert gas through said absorber with sufficient velocity and pressure to circulate absorption solution therethrough under the impulse imparted to the absorption liquid by the inert gas, means connecting said absorber and said boiler to form a circuit for circulation of absorption solution therebetween, said solution circuit including a fluid flow control opening arranged to receive absorption solution from said absorber and to discharge a substantially constant quantity of absorption solution per unit of time to limit the quantity of absorption solution flowing through said boiler per unit of time to a predetermined maximum amount and means for conducting absorption solution over and above said maximum amount to said absorber for recirculation therethrough by the inert gas.

25. Absorption refrigerating apparatus comprising a boiler assembly, an evaporator, an absorber, means for liquefying refrigerant vapor produced in said boiler assembly and for supplying the refrigerant liquid to said evaporator, a gas lift pump for conducting solution from said boiler assembly to said absorber, means for circulating an inert gas between said evaporator and said absorber and for propelling the inert gas through said absorber with a velocity and pressure sufficient to cause the inert gas to sweep or drag the absorption solution through said absorber as it is absorbing refrigerant vapor from the inert gas, means for conducting pumping gas to said gas lift pump, and means for conducting solution circulated through said absorber to said boiler assembly.

26. An absorption refrigerating apparatus of the three-fluid type embodying an evaporator, a boiler assembly, an absorber means for liquefying refrigerant vapor produced in said boiler assembly and for supplying the liquefied vapor to said evaporator, said absorber having a solution receiving portion located above said boiler assembly, means for conducting absorption solution from said boiler assembly to said solution receiving portion of said absorber comprising an elevating passageway arranged to discharge into said solution receiving portion and having a lower portion positioned above the normal liquid level in said boiler assembly, a gas lift pump arranged to elevate absorbing solution from said boiler into the lower portion of said passageway, means for introducing pumping gas into said gas lift pump below the liquid level therein and for propelling gas through said passageway with sufficient velocity and pressure to propel the solution therethrough by the frictional dragging action of the gas flowing in contact with the solution and means for conveying solution from said absorber to said boiler assembly.

27. An absorption refrigerating apparatus of the three-fluid type embodying an evaporator, a boiler assembly, an absorber means for liquefying refrigerant vapor produced in said boiler assembly and for supplying the liquefied vapor to said evaporator, said absorber having a solution receiving portion located above said boiler assembly, means for conducting absorption solution from said boiler assembly to said solution receiving portion of said absorber comprising an elevating passageway arranged to discharge into said solution receiving portion and having a lower portion positioned above the normal liquid level in said boiler assembly and a gas lift elevating conduit arranged to receive solution from said boiler assembly and to discharge solution into the lower portion of said passageway, means providing for circulation of inert gas through said evaporator and said absorber and for introducing inert gas into the lower portion of said passageway above the level of the solution supplied thereto under sufficient velocity and pressure to circulate the solution through said passageway and to pass into and out of said solution as it is conveyed to said absorber, means for conducting pumping gas from the inert gas circulating between said evaporator and said absorber and for introducing such pumping gas into said gas lift pump below the liquid level therein, and means for conducting absorption solution from said absorber to said boiler assembly.

28. In a refrigerating apparatus a circuit for circulation of an inert gas, a circuit for circulation of liquid, means in said gas circuit for raising the pressure of the gas circulating therein, means in said liquid circuit for regulating the flow of solution through said entire circuit comprising a gas operated liquid pump, means for supplying gas at the raised pressure to said pump for operating the same, and means for maintaining the liquid flowing to said pump at a constant level.

29. In a refrigerating apparatus a circuit for circulation of an inert gas, a circuit for circulation of liquid, means in said gas circuit for raising the pressure of the gas circulating therein, means in said liquid circuit for regulating the flow of solution through said entire circuit comprising a gas lift pump, means for supplying gas at said raised pressure to said pump for operating the same, and means for maintaining a constant depth of immersion on said pump and for removing liquid over and above the quantity required to maintain said constant depth of immersion to another portion of said liquid circuit.

30. In a refrigerating apparatus, means forming a circuit for inert gas, means in said inert gas circuit for raising the pressure of the gas therein, a circuit for flow of absorption solution having a part in common with said circuit for inert gas through which the inert gas circulates the solution by the frictional dragging action of the inert gas on the solution, means in said solution circuit for receiving solution from said part in common, means in said solution circuit for maintaining a constant head of solution in said receiving means, a gas lift pump in said solution circuit for discharging solution from said receiving means, and means for supplying the gas at said raised pressure to said gas lift pump for operating the same.

GEO. A. BRACE.